Figure 1:
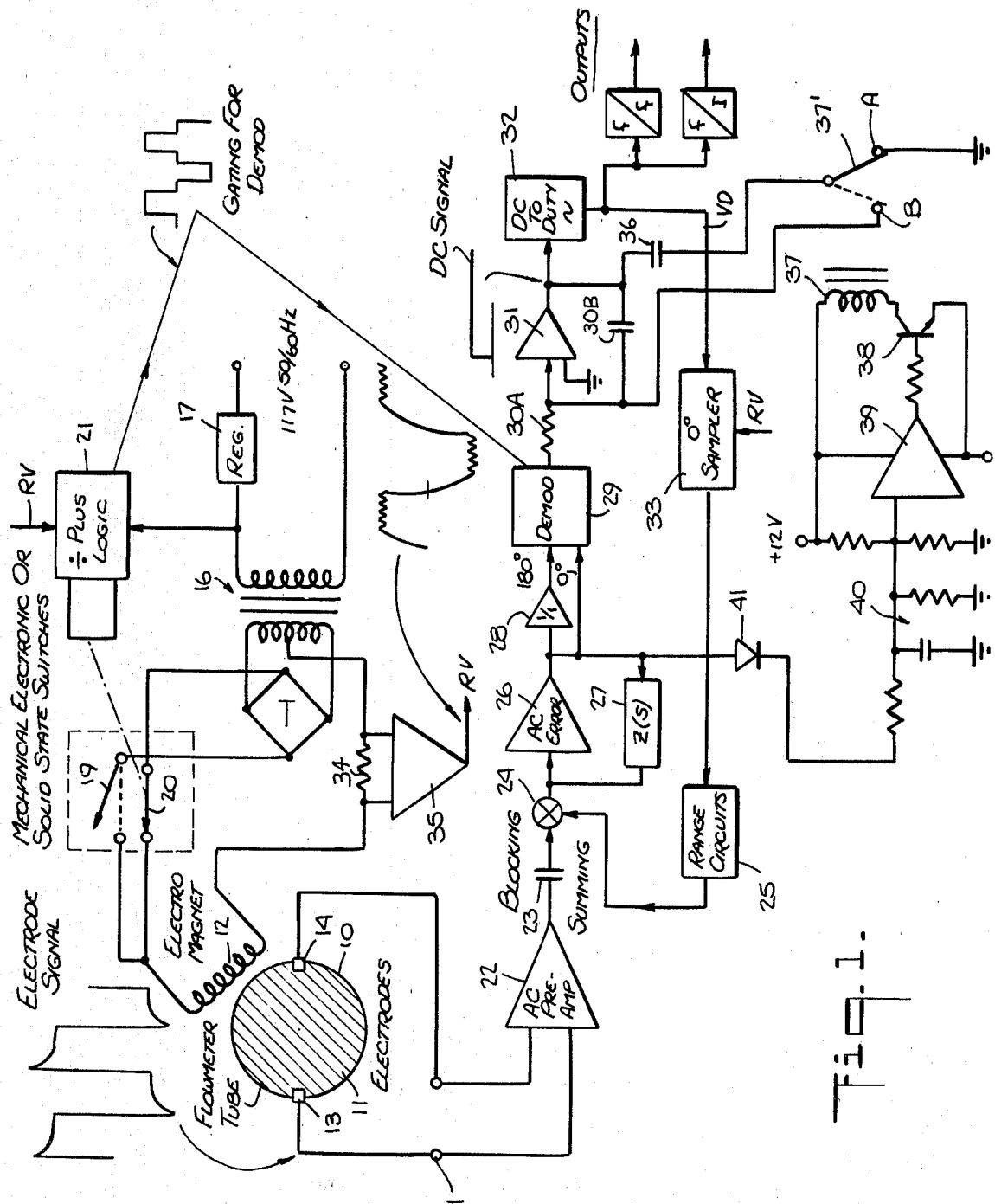

United States Patent [19]

Schmoock

[11] 4,370,892

[45] Feb. 1, 1983

[54] ELECTROMAGNETIC FLOWMETER HAVING NOISE SUPPRESSION NETWORK

[75] Inventor: Roy F. Schmoock, Yardley, Pa.

[73] Assignee: Fischer & Porter Co., Warminster, Pa.

[21] Appl. No.: 168,452

[22] Filed: Jul. 10, 1980

[51] Int. Cl.³ .............................................. G01F 1/60
[52] U.S. Cl. .............................. 73/861.12; 73/861.17; 328/165
[58] Field of Search ........... 73/861.12, 861.16, 861.17; 328/127, 128, 165

[56] References Cited

U.S. PATENT DOCUMENTS

| | | | |
|---|---|---|---|
| 3,432,761 | 3/1969 | Morine | 328/165 |
| 3,783,687 | 1/1974 | Mannherz et al. | 73/861.17 |
| 3,845,398 | 10/1974 | Katz | 328/128 X |
| 3,904,971 | 9/1975 | Delagrange | 330/280 |
| 3,911,776 | 10/1975 | Beigel | 328/167 X |

*Primary Examiner*—Charles A. Ruehl
*Attorney, Agent, or Firm*—Michael Ebert

[57] ABSTRACT

An electromagnetic flowmeter wherein a liquid to be metered is conducted through the flow tube of a primary to intersect a transverse magnetic field produced by an electromagnet. The resultant signal induced in the liquid is transferred to a pair of electrodes mounted at diametrically-opposed points on the tube. To avoid spurious signal components arising from stray couplings between the electromagnet and the loop constituted by the electrodes and the liquid bridging the electrodes, the coil of the electromagnet is energized by a low-frequency wave whose frequency is well below that of the standard a-c power line. And, to avoid noise components produced when the liquid being metered is a slurry containing solid particles which impinge on the surface of the electrodes, the flowmeter secondary includes a delayed automatic gain or smoothing network that is activated when a signal having excessive noise component is detected which persists for a predetermined period, activation serving to extend the response time of the secondary and thereby reduce the influence of the noise component thereon whereby the output of the secondary has a favorable signal-to-noise ratio.

9 Claims, 2 Drawing Figures

ELECTROMAGNETIC FLOWMETER HAVING NOISE SUPPRESSION NETWORK

BACKGROUND OF THE INVENTION

This invention relates generally to electromagnetic flowmeters wherein excitation current for the electromagnetic coil is a low-frequency wave, and more particularly to a flowmeter converter connected to the flowmeter electrodes which includes a delayed automatic gain or smoothing network for suppressing excessive noise.

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects this field, a voltage is induced therein which is transferred to the electrodes. This voltage, which is proportional to the average velocity of the liquid and hence to its average volumetric rate, is then amplified and processed in a converter to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation as disclosed, for example, in the Cushing U.S. Pat. No. 3,693,439 is clearly advantageous in that polarization is obviated and the A-C flow induced signal may be more easily amplified, it has distinct drawbacks. The use of an alternating flux introduces spurious voltages that are unrelated to flow rate and, if untreated, give rise to inaccurate indications. The two spurious voltages that normally are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow-induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnet flowmeters are also known to vary their calibration as a function of temperature, fluid conductivity, pressure and other effects which can alter the spurious voltage both with respect to phase and magnitude. Hence it becomes necessary periodically to manually re-zero the meter to correct for the effect on zero by the above-described phenomena.

All of the adverse effects encountered in A-C operation of electromagnetic flowmeters can be attributed to the rate of change of the flux field $(d\phi)/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition $(d\phi)/dt=0$ is satisfied. But, as previously noted, d-c operation to create a steady state field is not acceptable, for galvanic potentials are produced and polarization is encountered.

In the patent to Mannherz et al., U.S. Pat. No. 3,783,687, whose entire disclosure is incorporated herein by reference, there is disclosed an electromagnetic flowmeter in which the excitation current for the electromagnetic coil is a low-frequency wave serving to produce a periodically-reversed steady state flux field, whereby unwanted in-phase and quadrature components are minimized without giving rise to polarization and galvanic effects. This low frequency wave is derived by means of a presettable scaler coupled to the standard a-c power line (60 Hz) and is at a frequency in the order of 1⅞, 3¾, 7½ or 15 Hz.

When the fluid being metered takes the form of a coarse slurry containing solid particles such as sand, fly ash or salt which impinge on the surface of the electrodes as the slurry passes through the meter tube, it has been found that a substantial noise component is generated. This makes signal detection more difficult and in some instances impossible. The meter electrodes in combination with the fluid acting as an electrolyte define a galvanic cell, and when the solids in the slurry strike the electrodes and alter their interface to the fluid, this action brings about a rapid change in galvanic voltage, thereby generating low frequency noise.

A second source of noise arises when the flowmeter is run partially full. In the case of electrodes which make direct contact with the fluid, the resultant sloshing of the fluid on the surface of the electrodes produces excessive galvanic noise. In the case of electrodes which are capacitively coupled to the fluid, the sloshing action results in changes in dielectric constant (1 to 80) to produce capacitive noise.

Noise is any voltage that does not convey measurement information. Under the most favorable circumstances where noise has been minimized by filtering or other expedients, there are still certain sources of noise present resulting from the granular nature of matter and energy. While noise fluctuations may be small compared with the total energy transfer involved in most measurements, the existence of a noise background limits the ultimate sensitivity to which a measurement can be carried.

With electromagnetic flowmeters having a coil excited by an alternating current or a periodically interrupted direct current, when the fluid being metered is a slurry containing solid particles, a spectrum of noise voltages is generated. But the frequency components of this spectrum do not include the frequency of the standard a-c power line (i.e., 50 or 60 Hz). Hence in a magnetic flowmeter in which the excitation current is at the line frequency, no difficulty is experienced in discriminating between the flow-induced signal and noise components to provide a favorable signal-to-noise ratio.

But with an electromagnetic flowmeter of the above-described Mannherz type in which the excitation frequency is well below 60 Hz, it has been found that the frequency components of the noise spectrum actually lie within the excitation frequency range; hence discrimination between noise and signal cannot be effected by bandpass filtering, and the signal-to-noise ratio is unfavorable. Indeed, in some instances, the magnitude of the noise is of sufficient strength to cause a 100% output change in the converter, in addition to causing the average reading to be incorrect.

SUMMARY OF INVENTION

In view of the foregoing, the main object of this invention is to provide an electromagnet flowmeter having low frequency excitation for metering a slurry having solid particles therein which impinge on the flowmeter electrodes, the flowmeter including means to increase the response time of the converter and thereby decrease the influence of noise thereon.

More particularly, it is an object of this invention to provide a flowmeter whose excitation current is constituted by a periodic wave whose frequency is low relative to the frequency of the standard a-c power line from which the wave is derived, the flowmeter converter including a delayed automatic smoothing or gain network for suppressing excessive electrode noise.

Briefly stated, these objects are attained in an electromagnetic flowmeter in accordance with the invention, wherein a liquid to be metered is conducted through the flow tube of a primary to intersect a transverse magnetic field produced by an electromagnet, the resultant signal induced in the liquid being transferred to a pair of electrodes mounted at diametrically-opposed points on the tube.

To avoid spurious signal components arising from stray couplings between the electromagnet and the loop constituted by the electrodes and the liquid bridging the electrodes, the coil of the electromagnet is energized by a low-frequency wave whose frequency is well below the standard a-c power line frequency.

To avoid noise components produced when the liquid being metered is a slurry containing solid particles which impinge on the surface of the electrodes, the flowmeter secondary includes a delayed automatic gain or smoothing network which is activated when a signal having an excessive noise component is detected which persists for a predetermined period, activation serving to extend the response time of the secondary and thereby reduce the influence of the noise component therein whereby the output of the secondary has a favorable signal-to-noise ratio.

OUTLINE OF DRAWINGS

Figure 2:
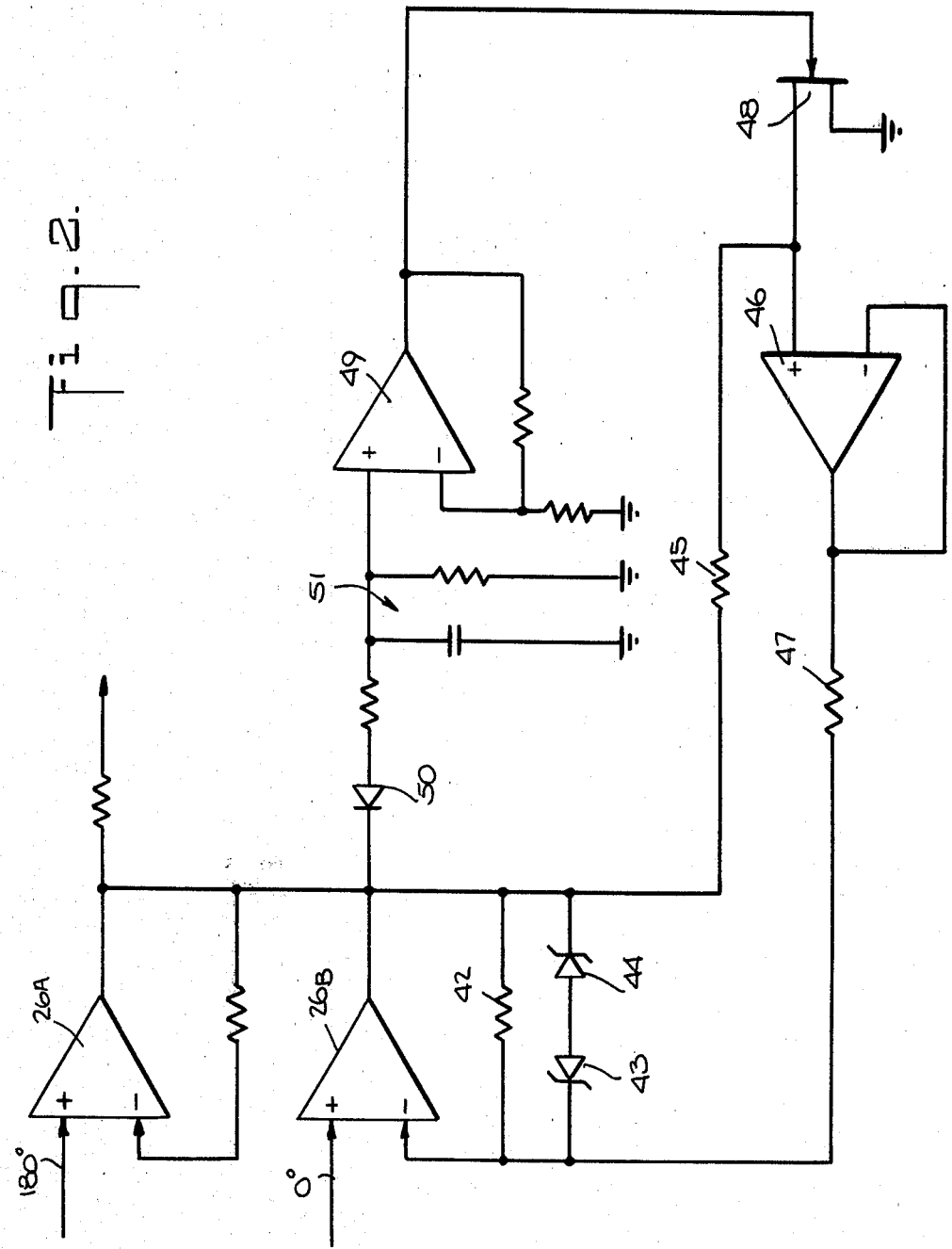

For a better understanding of the invention as well as other objects and further features thereof, reference is made to the following detailed description to be read in conjunction with the accompanying drawings, wherein:

FIG. 1 is a block diagram of an electromagnetic flowmeter which includes noise suppression delayed smoothing circuit in accordance with the invention; and FIG. 2 shows a delayed automatic gain circuit in accordance with the invention.

DESCRIPTION OF INVENTION

The Basic Flowmeter

Referring now to FIG. 1, there is shown a flowmeter system in accordance with the invention constituted by a primary in the form of an electromagnetic flowmeter adapted to produce a low-frequency signal output whose amplitude is proportional to the flow rate of the liquid being measured, and a secondary which converts this low level a-c signal to a proportional d-c current output signal.

In addition to an analog d-c current output, the secondary also yields a pulse output whose frequency is proportional to flow rate, the pulse output being useful in operating digital registers, counters or bath control systems. By means of proper scale factoring, registry of total accumulated flow may be integrated from this rate signal.

The flowmeter primary includes a flow tube 10 through which the liquid 11 to be measured is conducted. An electromagnet having a coil 12 is provided to establish a magnetic field transverse to the direction of flow which is parallel to the longitudinal axis of the tube. Electrodes 13 and 14 in contact with the flowing fluid are disposed at diametrically-opposed points on the flow tube on an axis which is perpendicular both to the longitudinal direction of flow and the transverse magnetic field. The invention is also applicable to electrode arrangements in which the electrodes are capacitively coupled to the fluid, in which event the resultant noise is of capacitive origin, as explained in the introduction.

As is well known, a voltage is induced in the liquid whose flow intersects the magnetic field, this voltage being transferred to the electrodes to produce a signal at flowmeter output terminals that reflects the flow rate. This signal is referred to as the flow-induced signal to distinguish it from spurious signal components that are independent of flow rate and noise.

Magnet coil 12 is energized by a relatively low-frequency square wave derived from a full-wave rectifier power supply constituted by a transformer 16 whose primary is connected to an a-c power line through a regulator 17, the line supplying the usual 50 or 60 Hz current. The secondary of transformer 16 is connected to the input junctions of a full-wave rectifier bridge 18, whose output junctions are connected to the respective movable contacts of two single-pole single-throw switches 19 and 20 whose fixed contacts are both connected to one end of magnet coil 12. The other end of the coil is connected to the center tap of the secondary of transformer 16.

When switch 19 is closed and switch 20 is simultaneously open, the rectified output is applied to the magnet coil in one polarity, and when switch 19 is open and switch 20 is simultaneously closed, the polarity is reversed. While for purpose of explanation, switches 19 and 20 are shown as mechanical devices, in practice these switches are in electronic form and may be constituted by thyratrons, triacs or any other type of electronic switching device in vacuum tube or solid-state form.

Switches 19 and 20 are activated at a rate which is low relative to the frequency of the a-c line. This is accomplished by means of a presettable scaler or frequency divider 21 to which the 60 Hz line voltage is applied as a clock signal, the scaler yielding low frequency pulses in the order of $1\frac{7}{8}$, $3\frac{3}{4}$, $7\frac{1}{2}$ or 15 Hz.

The low frequency pulses from the scaler are applied to the firing electrodes of the two triac switches (or whatever other electronic switching devices are used) to alternately turn on the triacs and thereby connect either the positive or the negative side of the full-wave rectified 60 Hz voltage to the magnet coil. Thus when switch 19 is closed, current flows through the magnet coil in one direction; and when switch 20 is closed, the current flows in the reverse direction.

Because the output of the full-wave rectifier is a raw unfiltered direct voltage, it is composed of a continuous train of half-cycle pulses, all of the same polarity. But with the low-frequency switching action, the voltage applied to magnet coil 12 is periodically reversed in polarity, as a result of which the current passing through the coil has a 120 Hz ripple component.

Because the electromagnet has a relatively high inductance, it functions as a filter choke and, in practice, it takes out as much as 75 percent of the ripple component. The remaining portion of the 120 Hz ripple component that appears in the flow-induced signal is smoothed out at the summing junction of the secondary via the filter action of the associated error amplifier, to be later described. This obviates the need for filter capacitors associated with the choke, as in conventional filters. Thus, the system functions as if it were excited by a "square wave equivalent" having a substantially constant amplitude.

The flow-induced signal appearing at output terminal 15 of the flowmeter primary is fed to a secondary constituted by a converter. This converter is essentially an all solid-state a-c feedback system producing a frequency output (and optional current) whose rate is proportional to flow.

In the converter, the flow-induced signal appearing at output terminals 15 is applied to the first stage of the converter which is an a-c pre-amplifier 22. This signal has a generally square-wave formation but for the spikes appearing at the points of polarity reversal. These spikes are the result of switching transients or surges and have a duration depending on the inductance-resistance time constant of the electromagnetic circuit.

The constant level portion of the square wave reflects the steady state condition of the magnetic field and has an amplitude that is directly proportional to the velocity of liquid passing through the flow tube. Hence it is only this portion of the signal which is of interest for accurate measurement purposes.

The output of pre-amplifier 22 is applied through a blocking capacitor 23 to one input of a summing junction 24 to whose other input is fed the output of a range attenuation circuit 25 from an error signal type of feedback loop. The error signal produced by a comparison of the flow signal and the feedback signal in the summing junction is amplified in a-c error amplifier 26, which is provided with a sub-negative feedback circuit 27 adapted to attenuate all frequencies lower and higher than that of the error signal.

The a-c output of error amplifier 26 is applied as a 0° signal with respect to the flow signal to a full-wave demodulator 29 and is also applied to an inverting (1:1) amplifier 28 whose output is applied as a 180° signal to full-wave demodulator 29. The operation of the demodulator is synchronized with the low-frequency switching rate of the magnet coil and is so gated as to block the applied error signal at those points corresponding to the point of polarity reversal, the blockage being maintained for the duration of the inductance-resistance time constant of the electromagnetic circuit. In this way, the d-c output of the demodulator reflects only the steady state magnetic flux condition, the spike portions of the flow-induced signal being suppressed.

In order to so synchronize the demodulator, the frequency divider 21 which responds to the 50 or 60 cycle signal to produce low-frequency control pulses for governing the electromagnetic switching action is provided with suitable logic to produce gating pulses at the same low-frequency rate. These gating pulses are coincident with the steady state portion of the flow-induced signal. Thus, the demodulator is activated only during the steady state intervals and is otherwise blocked. As a consequence, the secondary only looks at the flow-induced signal during the point that $d\phi/dt$ is equal to zero.

The d-c output pulses produced by demodulator 29 are applied to a Miller integrator including an input resistor 30A, a d-c amplifier 31 and a feedback capacitor 30B to produce a direct-voltage error signal whose magnitude is a function of flow rate. This d-c amplified error signal is used as a controlled bias for a d-c to frequency converter 32 that, in practice, may take the form of a blocking oscillator.

The blocking oscillator translates the d-c error signal level to a variable frequency pulse train which exhibits a duty cycle that is proportional to the error signal. This variable duty cycle error signal VD is used to drive the output circuits of the system as well as serving as the take-off point for the error signal feedback circuit.

For purposes of feedback, the variable duty cycle error signal must first be restored to a proportional low-frequency signal (i.e., $1\frac{7}{8}$ Hz or whatever low frequency is in effect). This is accomplished by means of a sampling circuit 33 coupled to the dc-to-duty cycle converter 32 and acting to sample in-phase reference voltage RV derived from the electromagnet circuit. To generate this reference voltage, a fractional ohm resistor 34 is interposed between magnet coil 12 and the center tap of the secondary of transformer 16, the voltage drop thereacross depending on current flow through the magnet coil. This voltage is applied to an operational amplifier 35 to produce reference voltage RV at its proper level. The output of sampler 33 is constituted by the duty-cycle pulses derived from the d-c to frequency converter, enveloped by the low frequency square wave reference voltage RV. This output is fed to summing junction 24 through the range attenuator 25. Inasmuch as this feedback signal depends on the amplitude of reference voltage RV, any variation in the voltage as a result of line fluctuations will proportionately change the feedback signal. Since it is the ratio of the flow-induced signal to the feedback signal that constitutes the measurement criterion, no loss of accuracy will be experienced with variations in line voltage (within reasonable limits).

The signal from the dc-to-duty cycle converter is applied to a duty-cycle-to-dc converter F/I, which converts the pulses of the former into an analog d-c output that is proportional to fluid flow rate. The signal from the dc-to-duty cycle converter is also applied to a pulse scaler F/F which converts the applied pulses into engineering units which are available to drive an external counter.

Instead of reversing polarity, the electronic switches may be arranged to merely interrupt the flow of unidirectional half-wave pulses to the magnet coil so that instead of a square-wave current in the coil in which successive square wave pulses alternate in polarity, all of the square-wave pulses are of the same polarity.

As pointed out previously, when the liquid 11 being metered is a slurry having solid particles therein which impinge on the electrode surface in the course of passage through flow tube 10, noise voltages are generated whose magnitude is relatively high. With low-frequency excitation currents, the excitation frequency range lies within the spectrum of noise components; hence the noise components tend to mask the flow-induced signal and it is difficult to obtain accurate flow rate readings.

Delayed Smoothing Network

In those situations where a coarse slurry rather than a liquid free of particles appears intermittently or where the flow tube is intermittently only partially full, it is then desirable to provide a response time of 4 seconds which is operative whenever the meter is quiet; that is, when there is no slurry and a full pipeline. When, however, an excessive noise-producing condition is encountered, it is then desirable to automatically extend the response time, but only after excessive noise has persisted for a predetermined period, as, for example, more than 5, 10 or 20 seconds. This is necessary in order to avoid an automatic extension of response time as a reaction to momentary noise transients.

To this end, a delayed smoothing network is provided that includes a capacitor 36 which, when the network is activated, is shunted across the feedback capacitor 30B of the Miller integrator to extend the response time of the converter. The value of this capacitor may be 5 to 50 microfarads, depending on the desired delay. The capacitor switching action is controlled by a relay 37 whose pivoted armature 37' normally engages a contact A connecting capacitor 36 to ground. When relay 37 is energized, armature 37' is then caused to engage a contact B which serves to connect capacitor 36 across capacitor 30B.

Relay 37 is connected through the emitter-collector path of a switching transistor 38 across a d-c supply (12 V). The base of this transistor is connected to the output of a control amplifier 39 whose input is connected through an R-C timing circuit 40 and a diode 41 to the output of A-C error amplifier 26.

Thus the output of the error signal channel is sensed; and if the error signal exceeds normal balance conditions, this being indicative of the presence of excessive noise, the timing circuit begins to time out. If the error signal returns to normal in 4 seconds or less with a change in flow, the bias applied to amplifier 39 will not be sufficient to effect energization of relay 37.

If, however, the excessive error signal is due to noise and it persists for a prolonged period (i.e., 5 to 20 seconds), relay 37 will then be energized to switch in smoothing capacitor 36 to extend the response time to the converter from a 4 second to a 100 second interval, or whatever other extension is provided by the parameters selected for the delay network. In the Miller integrator, the switching in of an additional feedback capacitance acts to increase the loop time constant and thereby greatly extends the response time.

Delayed Automatic Gain

Referring now to FIG. 2, an arrangement is shown providing delayed automatic gain to extend the response time of the converter and thereby reduce the influence of noise components thereon.

The circuit shown in FIG. 2 represents an insert to be made in FIG. 1 between inverting amplifier 28 and full-wave demodulator 29. This insert includes a pair of differential amplifiers 26A and 26B, the 180° output from inverting amplifier 28 in FIG. 1 going to the non-inverting input of amplifier 26A whose output is applied to the one input of demodulator 29, the 0° output from amplifier 26 in FIG. 1 which goes to the other input of the demodulator also going to the non-inverting input of amplifier 26B. The output of amplifier 26B is applied to the inverting input of amplifier 26A.

Error amplifier 26B is provided with a first feedback path between the output and the inverting input, the path being defined by a feedback resistor 42 shunted by series-connected diodes 43 and 44. To effect delayed gain, a second feedback path is provided which is connected between the output of amplifier 26B and its inverting input, this path being constituted by a resistor 45 coupled through an amplifier 46 to a resistor 47.

Amplifier 46 is normally maintained in an inactive state by a control transistor 48 (FET) which is coupled to the output of a control amplifier 49. The output of error signal amplifier 26B is connected through a diode 50 and a timing circuit 51 to the non-inverting input of control amplifier 49 which functions to apply a control signal to transistor 48 to activate amplifier 46 and thereby render the second feedback path effective. Because of the additional feedback, the feedback loop is reduced, thereby extending the response time.

As with the first embodiment, the timing circuit 51 serves to render the automatic gain system operative only when an excessive error signal is sensed indicative of noise, and this noise persists for a predetermined period.

In a delayed action converter in accordance with the invention, the reason why an extended responsive time reduces the influence of the noise component in the signal yielded by the meter electrodes is that the converter is a closed loop system which behaves like a low-pass filter that blocks all frequencies above a break point. It is this break point or corner that is set by the response time of the converter. Thus if the response time were one second, the break point would occur at about 1 Hz; but if the system was slowed to a ten-second response time, the corner would be moved down to one-tenth Hz.

While there has been shown and described a preferred embodiment of an electromagnetic flowmeter having noise suppression network in accordance with the invention, it will be appreciated that many changes and modifications may be made therein without, however, departing from the essential spirit thereof. Thus while the networks to extend response time have been disclosed in the context of converters included in magnetic flowmeters, these networks are also usable in other applications wherever the need exists to suppress noise components accompanying a signal.

I claim:

1. An electromagnetic flowmeter for measuring the flow rate of a liquid to produce a signal having noise components when the liquid assumes the form of a slurry containing solid particles or when the flowmeter runs partially full and the liquid sloshes therein, said flowmeter comprising:

(A) a primary provided with a flow tube through which the liquid flows and having a pair of electrodes mounted thereon at diametrically-opposed positions, whereby the impingement of said solid particles thereon may result in the generation of noise components, the existence of a partially filled tube also producing noise components; and an electromagnet having a coil excited by a periodic wave derived from a standard a-c power line, the frequency of the wave being low relative to that of the line frequency to produce a transverse magnetic field within the tube which is intersected by the liquid, the voltage induced in the liquid being transferred to said electrodes to provide a flow-induced signal accomplished by said noise components; and (B) a secondary constituted by a converter coupled to said electrodes, said converter including a delayed action network which is activatable when the signal yielded by the electrodes is accompanied by excessive noise components which persist for a predetermined period, activation of the network serving to extend the response time of the converter to thereby reduce the influence of the noise components thereon to provide a converter output having a favorable signal-to-noise ratio.

2. An electromagnetic flowmeter as set forth in claim 1, wherein said coil excitation is effected by a rectifier connected to said line and switching means periodically applying the output of said rectifier to said coil at a rate which is low relative to the line frequency.

3. An electromagnetic flowmeter as set forth in claim 1, wherein said converter includes an a-c error amplifier responsive to the signal yielded by the electrodes, the output of the a-c amplifier being applied to a demodulator whose d-c output is applied to a Miller integrator having a feedback capacitor.

4. An electromagnetic flowmeter as set forth in claim 3, wherein said network is a delayed smoothing network which includes a second capacitor that is shunted across the feedback capacitor when the network is activated to extend the response time of the converter.

5. A flowmeter as set forth in claim 4, wherein said activation is effected by a control amplifier connected to the output of the error amplifier through a timing circuit and a diode, said control amplifier energizing a relay to connect the second capacitor across the feedback capacitor.

6. A flowmeter as set forth in claim 1, wherein said converter includes a delayed gain network which acts to extend the response time.

7. A flowmeter as set forth in claim 6, wherein said delayed gain network includes a second feedback path which is shunted across a first feedback path in said error amplifier when the network is actuated to reduce the gain thereof.

8. In a system as set forth in claim 1, wherein said predetermined period is about 4 seconds and said response time is about 100 seconds.

9. In a system in which a signal is produced which is accompanied by a noise component, a channel responsive to said signal to provide a useful output, said channel including a delayed action network and means that senses the signal and activates the network when the noise component thereof is excessive and persists for a predetermined period, activation of the network serving to extend the response time of the channel to thereby reduce the influence of the noise component to provide an output having a favorable signal-to-noise ratio.

* * * * *

UNITED STATES PATENT OFFICE
CERTIFICATE OF CORRECTION

Patent No. 4,370,892    Dated February 1, 1983

Inventor(s) Roy F. Schmoock

It is certified that error appears in the above-identified patent and that said Letters Patent are hereby corrected as shown below:

Column 9, line 17, change "accomplished" to --accompanied--

Signed and Sealed this

Thirty-first Day of May 1983

[SEAL]

Attest:

DONALD J. QUIGG

Attesting Officer    Acting Commissioner of Patents and Trademarks